United States Patent [19]

Uchida et al.

[11] Patent Number: 5,073,871

[45] Date of Patent: Dec. 17, 1991

[54] MAIN STORAGE ACCESS PRIORITY CONTROL SYSTEM THAT CHECKS BUS CONFLICT CONDITION AND LOGICAL STORAGE BUSY CONDITION AT DIFFERENT CLOCK CYCLES

[75] Inventors: Nobuo Uchida; Yuji Oinaga, both of Tokyo; Mikio Itoh, Yokohama, all of Japan

[73] Assignee: Fujitsu Limited, Kawasaki, Japan

[21] Appl. No.: 246,087

[22] Filed: Sep. 19, 1988

[30] Foreign Application Priority Data

Sep. 19, 1987 [JP] Japan .................. 62-233704
Oct. 12, 1987 [JP] Japan .................. 62-256794
Dec. 10, 1987 [JP] Japan .................. 62-314745

[51] Int. Cl.⁵ .................. G06F 13/18; G06F 13/36; G06F 12/06
[52] U.S. Cl. .................. 395/425; 364/931.46; 364/931.51; 364/935.41; 364/955.1; 364/242.91; 364/242.92; 364/255.5; 364/254.3
[58] Field of Search ... 364/200 MS File, 900 MS File

[56] References Cited

U.S. PATENT DOCUMENTS 4,212,057 7/1980 Devlin et al. .................. 364/200
4,314,335 2/1982 Pezzi .................. 364/200
4,395,753 7/1983 Comfort et al. .................. 364/200
4,445,174 4/1984 Fletcher .................. 364/200
4,875,161 10/1989 Lahti .................. 364/200

Primary Examiner—Thomas C. Lee
Assistant Examiner—Ken S. Kim
Attorney, Agent, or Firm—Staas & Halsey

[57] ABSTRACT

An access priority control system for a main storage for a computer, for controlling a signal transmission to the main storage upon receiving a plurality of storage access requests from at least one processor related to the main storage. The system includes a first access request port unit for holding at least temporarily a segment address of the storage access requests from the processor; a first control unit responsive to the output of the first access request port unit for checking bus conflict conditions and prohibition conditions for a destination storage segment determined by the address of the storage access request; a second access request port unit responsive to the output of the first control unit for holding at least temporarily an intra-segment address of the storage access request; and a second control unit responsive to the output of the second access request port unit for checking logical storage busy conditions in the storage segments.

11 Claims, 13 Drawing Sheets

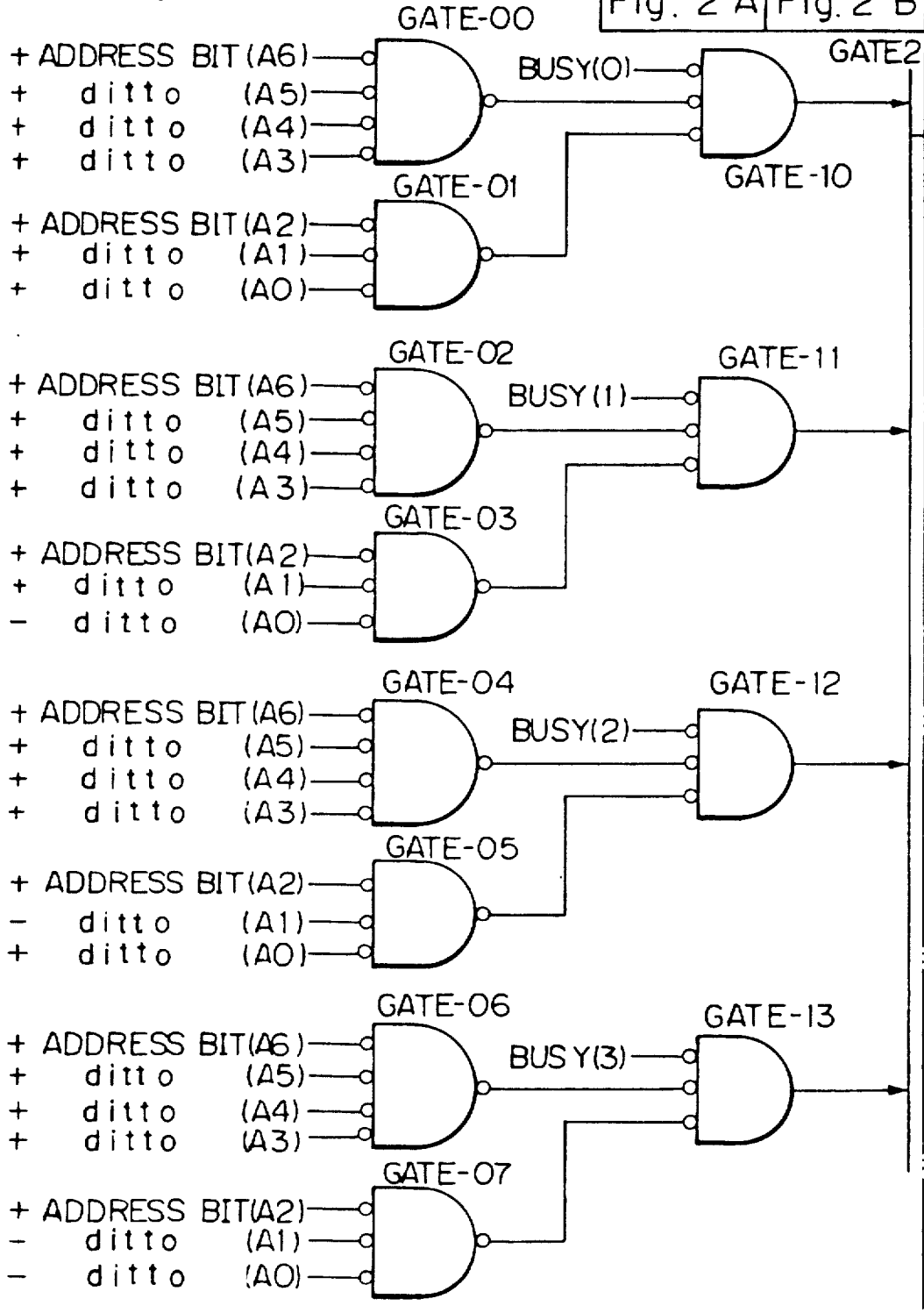

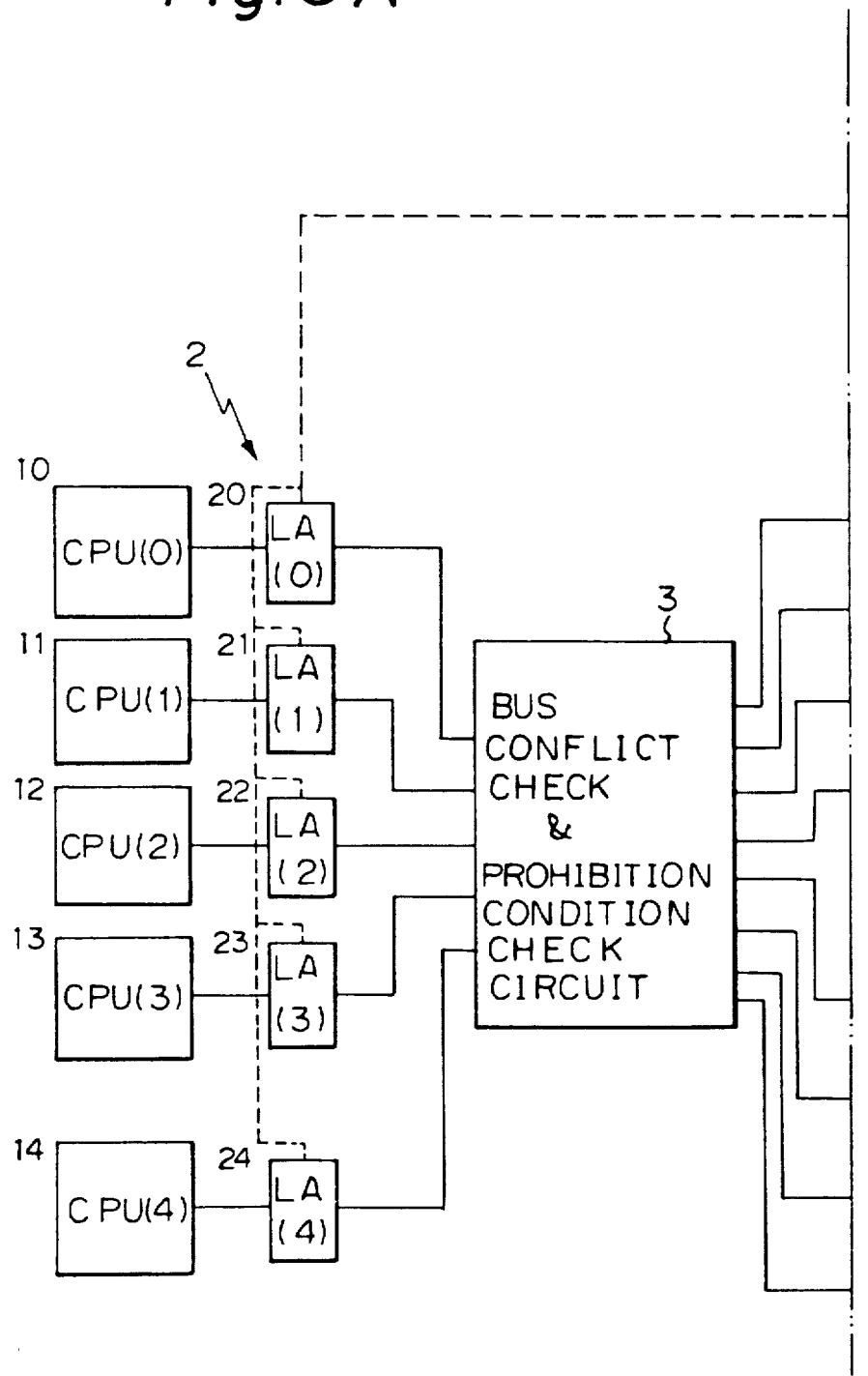

PORT OP CODE REGISTER

| B₀ | B₁ | STATUS |
|----|----|--------|
| 0  | 0  | NOP |
| 1  | 0  | 8 BYTE BLOCK |
| 0  | 1  | 16 BYTE BLOCK |
| 1  | 1  | 32 BYTE BLOCK |

FIRST LATCH CIRCUIT

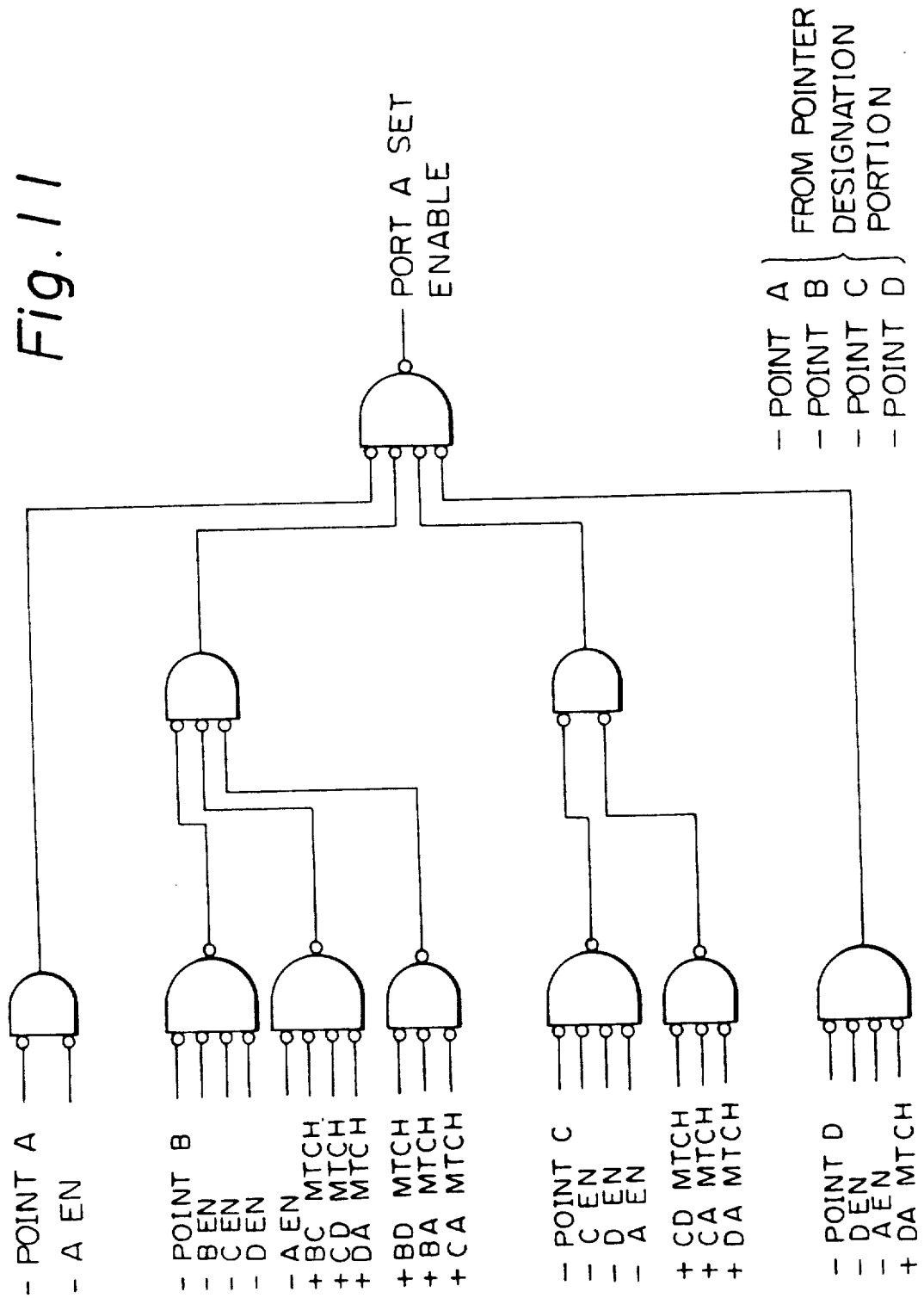

Fig. 12
FIRST LATCH CIRCUIT     SECOND LATCH CIRCUIT
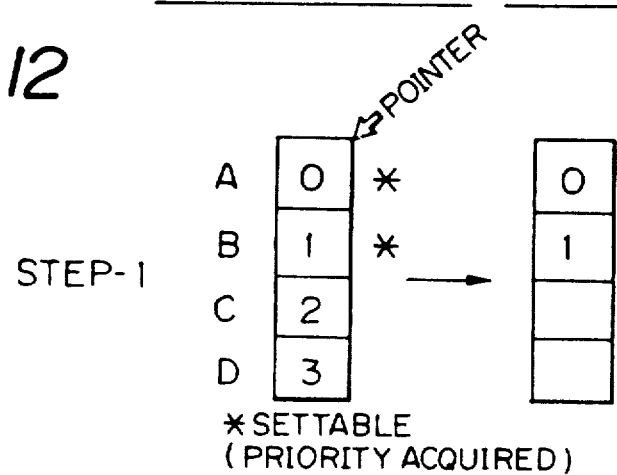
STEP-1
*SETTABLE
(PRIORITY ACQUIRED)
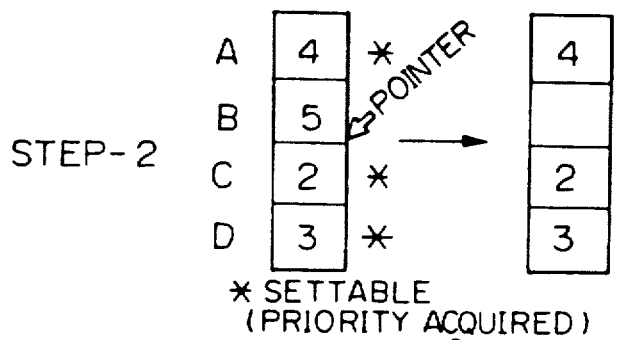
STEP-2
*SETTABLE
(PRIORITY ACQUIRED)
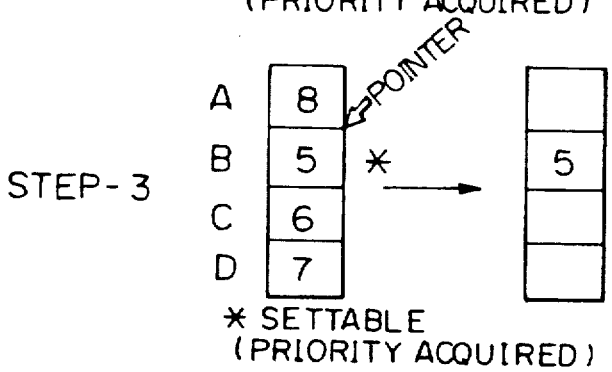
STEP-3
*SETTABLE
(PRIORITY ACQUIRED)
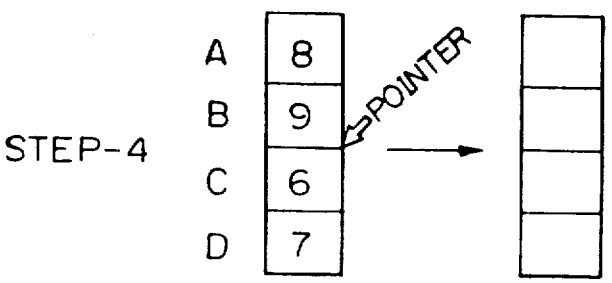
STEP-4

5,073,871

1

MAIN STORAGE ACCESS PRIORITY CONTROL SYSTEM THAT CHECKS BUS CONFLICT CONDITION AND LOGICAL STORAGE BUSY CONDITION AT DIFFERENT CLOCK CYCLES

BACKGROUND OF THE INVENTION

1. Field of the Invention

The present invention relates to an access priority control system for a main storage for a computer. The system according to the present invention is used for access to a main storage for a computer in which the storage space of the main storage is hierarchically divided. The system according to the present invention can be used for control of an access priority order of a main storage in which a very high probability of existence of successive data of reading or writing, such as vector data, in the same divided storage space is utilized as in the multiple system.

The system according to the present invention is applicable to a vector computer wherein a high speed vector calculation of scientific computation for carrying out a calculation in parallel or in the pipeline manner is used, as well as to a general purpose computer 2. Description of the Related Art With regard to a main storage unit for a computer in which the storage space is divided into a plurality of segments having different buses and different storage banks, when an access request for read/write is received from a plurality of processors or other external devices, the priority order of the access requests must be determined and a bus conflict between the buses and a busy condition of the storage banks must be controlled.

It is very important to reduce the length of the longest logic path of the control circuit for controlling the priority order and the busy condition checking in a predetermined cycle of the clock signal.

Nevertheless, in the prior art system, the checking of the bus conflict, storage bank busy condition, and prohibition condition are carried out in a single cycle, and the determination of an approval of access to the main storage is carried out in that single cycle. Therefore, the checking of the bus conflict, storage bank busy condition, and prohibition condition must be carried out in a single cycle for all of the access parts, and accordingly, problems arise in that the delay time is very long and the amount of hardware needed is large.

Also, in the prior art system, since the number of access ports is increased and the wirings causes a capacitance effect, the delay time of the longest logic path is increased, and accordingly, an extension of time is required, which has an undesirable effect on the selection of a machine cycle of the system.

SUMMARY OF THE INVENTION

It is an object of the present invention to provide an improved access priority control system for a main storage for a computer in which the delay time in a priority cycle is reduced, and the time for one clock cycle is reduced.

It is another object of the present invention to reduce the amount of hardware needed for an access priority control system for a main storage for a computer.

According to the present invention, there is provided an access priority, control system for a main storage for a computer, for controlling a signal transmission to the main storage when a plurality of storage access requests are output from at least one processor related to the main storage, in which the system includes a first access request port unit for holding, at least temporarily, a segment address of the storage access requests from the processor; a first control unit responsive to the output of the first access request port unit for checking a bus conflict condition and prohibition condition of a destination storage segment determined by the address of the storage access request; a second access request port unit responsive to the output of the first control unit for holding at least temporarily an intra-segment address of the storage access request; and a second control unit responsive to the output of the second access request port unit for checking a logical storage busy condition in the storage segments.

BRIEF DESCRIPTION OF THE DRAWINGS

In the drawings,

FIG. 11 shows an example of the circuit for obtaining the setting condition equation; and FIG. 12 illustrates the changes of destination by the pointer.

DESCRIPTION OF THE PREFERRED EMBODIMENTS

Figure 1:
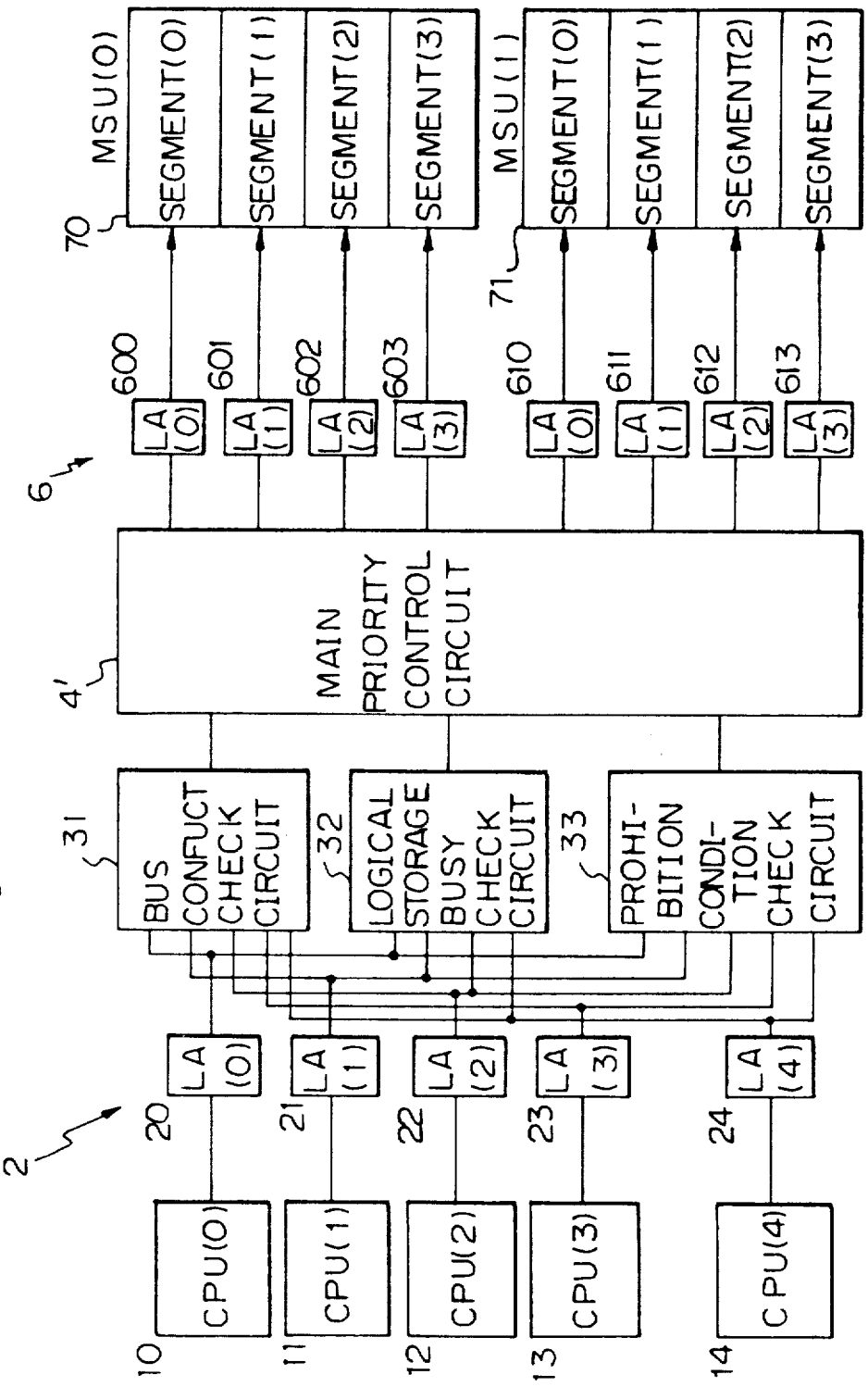
FIG. 1 shows a prior art access priority control system for a main storage for a computer.

Before describing the embodiments of the present invention, a prior art access priority control system for a main storage for a computer is explained with reference to FIGS. 1 and 2. In the prior art system of FIG. 1, there are provided central processor units CPU(0) 10, CPU(1) 11, CPU(2) 12, CPU(3) 13, and CPU(4) 14; a first sequence of latch circuits (LA) 20, 21, 22, 23, and 24, as a first sequence of access request ports; a bus conflict check circuit 31; a logical storage busy check circuit 32, a prohibition condition check circuit 33, a main priority control circuit 4'; a second sequence of latch circuits (LA) 600, 601, 602, 603, 610, 611, 612, and 613, as a second sequence of access request ports; and main storage units MSU(0) 70 and MSU(1) 71.

The main storage unit MSU(0) 70 is divided into a sequence of segments SEGMENT(0), SEGMENT(1), SEGMENT(2), and SEGMENT(3), and each of these segments is divided into, for example, 16 storage banks.

which are called logical storages. The segments are connected with corresponding buses.

The second sequence of latch circuits 600 to 603 corresponds to the sequence of segments SEGMENT(0) TO SEGMENT(3). When a valid signal from the main priority control circuit 4' is latched in the latch circuit 6, use of a bus and a storage bank corresponding to the valid signal is approved. Each main storage unit is constituted by 4 segments, and each segment is constituted by 16 storage banks, and therefore, the main storage units 70 and 71 include 128 storage banks.

The busy check of the access to the storage banks is carried out such that a read and write cannot be carried out at a storage bank in the busy state, but a read and write can be carried out at a storage bank in the non-busy state.

A non-busy storage bank must be selected when simultaneous accesses to two or more storage banks related to the same bus are required. Also, an unused bus must be selected, to avoid a bus conflict which might occur if a bus is required to transmit a plurality of data.

In the prior art system of FIG. 1, the bus conflict check, the logical storage busy check, and the prohibition condition check are carried out simultaneously in the same cycle of a clock signal, and accordingly, the decision on whether or not the access to the main storage is approved is carried out in a single cycle.

When a storage access request is received from an external device, the access request address signal is latched in the latch circuit 2 in a given cycle, and the access request address signal is supplied to the bus conflict check circuit 31 through a signal line, to the logical storage busy check circuit 32 through a signal line, and to the prohibition condition check circuit 33 through a signal line, simultaneously, in the next cycle. The outputs of the bus conflict check circuit 31, the logical storage busy check circuit 32, and the prohibition condition check circuit 33 are supplied to the main priority control circuit 4' in the same priority cycle, and the resulting output of the main priority control circuit 4' is set in the latch circuit 6.

The address signal to be latched in the latch circuit 2 is, for example, an address signal of seven bits: A6, A5, A4, A3, A2, A1, A0, which can access one of 128 storage banks. The A6 bit designates one of the main storage units 70 and 71, and the A5 and A4 bits designate one of the segments of the main storage unit. Accordingly, the upper 3 bits: A6, A5, A4, can be used to check the existence of a bus conflict with regard to eight segments of the main storage.

The bus conflict check circuit 31 is supplied with the upper address bits: A6, A5, A4 of the address signal, checks whether or not the supplied address bits coincide with the code corresponding to the bus being used, and delivers a coincidence/non-coincidence signal to be supplied to the main priority control circuit 4' through a signal line.

The logical storage busy check circuit 32 is supplied with the entire 7 bits: A6 to A0, of the address signal, decodes the supplied address bits, checks whether or not the decoded 128 signals coincide with the busy signals indicating busy states of the 128 storage banks, and delivers a coincidence/non-coincidence signal to be supplied to the main priority control circuit 4' through a signal line.

The prohibition condition check circuit 33 is supplied with the address signal, decodes the supplied address bits, compares the decoded signal with the prohibition condition signal to produce a coincidence/non-coincidence signal, and supplies the produced coincidence/non-coincidence signal to the main priority control circuit 4' through a signal line.

In the prior art system of FIG. 1, in the request transfer cycle, a memory access request from the central processor unit or other external device is carried out; in the next priority cycle, a checking of all conflict conditions and prohibition conditions for all access ports and a checking of all priority orders are carried out, based on the setting of a request address in the latch circuit 2; and, in the next main storage unit transmitting cycle, a memory access is started based on the setting of the signal determined in the above-mentioned next priority cycle in the latch circuit 6.

Figure 2B:
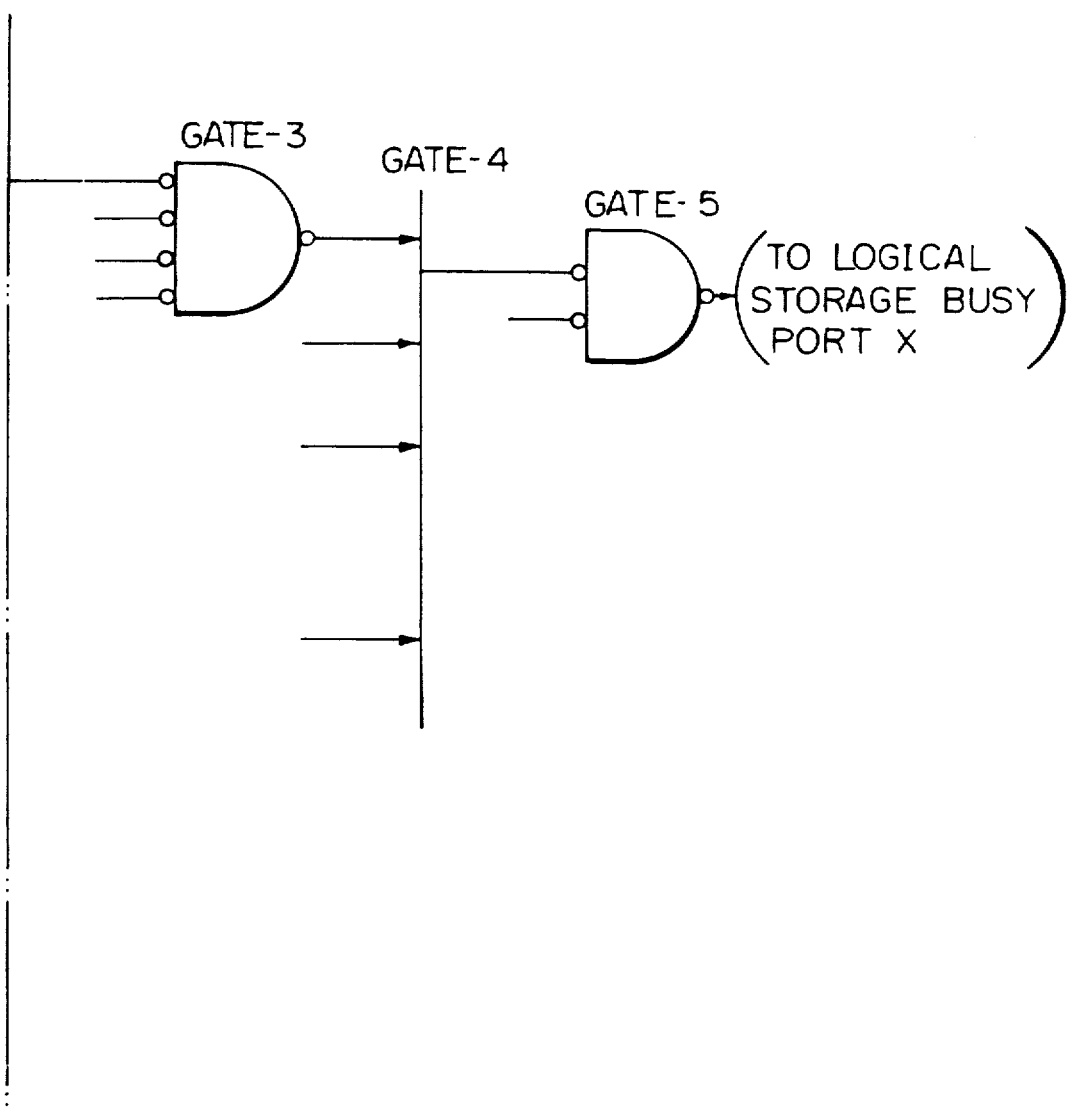
FIG. 2, formed by FIGS. 2A and 2B, shows the structure of a part of the logical storage busy check circuit used for the prior art system.

The structure of a part of a prior art logical storage busy check circuit 32 used for the prior art system of FIG. 1 is shown in FIG. 2. The logical storage busy check circuit of FIG. 2 is constituted by a sequence of GATES-00 to GATES-07, a sequence of GATES-10 to GATES-13, GATE-2, GATE-3, GATE-4, and GATE-5. Each of the GATE-00 to GATE-07, GATE-10 to GATE-13, GATE-3, and GATE-5 is constituted by an emitter coupled logic (ECL) circuit. The address signal of 7 bits: A6, A5, A4, A3, A2, A1, A0 is supplied to GATE-00 through GATE-07. GATE-2 and GATE-4 are emitter dot type OR gates and do not cause delay problems.

GATE-00 and GATE-01 are supplied with a 7 bit address signal: A6, A5, A4, A3, A2, A1, A0 as an input signal, which signal comprises all logic "0's" when the address A6, A5, A4, A3, A2, A1, A0 is logic "0, 0, 0, 0, 0, 0, 0"; GATE-02 and GATE-03 are supplied with a 7 bit address signal, which signal comprises all logic "0's" when the address: A6, A5, A4, A3, A2, A1, A0 is logic "0, 0, 0, 0, 0, 0, 1"; GATE-04 and GATE-05 are supplied with a 7 bit address signal, which signal comprises all logic "0's" when the address: A6, A5, A4, A3, A2, A1, A0 is logic "0, 0, 0, 0, 0, 1, 0"; and GATE-06 and GATE-07 are supplied with a 7 bit address signal, which signal comprises all logic "0's" when the address: A6, A5, A4, A3, A2, A1, A0 is logic "0, 0, 0, 0, 0, 1, 1". Although only a part of the logical storage busy check circuit is shown in FIG. 2, there are actually 128 gate pairs including the shown 4 gate pairs GATE-00 and GATE-01; GATE-02 and GATE-03; GATE-04 and GATE-05; and GATE-06 and GATE-07, so that, in practice, the extent of circuit of the logical storage busy check circuit is 32 times that of the FIG. 2 circuit. The logic "0" outputs of GATE-00 and GATE-01, which are delivered when all of the input signal to GATE-00 and GATE-01 are logic "0's", are supplied to GATE-10, and GATE-10 delivers a logic "1" when the signals supplied from GATE-00 and GATE-01 are logic "0, 0" and the busy signal: BUSY(0) is logic "0". GATE-11, GATE-12, and GATE-13 operate in the same manner.

Assuming that the delay time per unit gate is $\tau$, the delay time of the logical storage busy check circuit of FIG. 2 is $4\tau$. There are 393 gates for one port, and when 5 ports exist, the number of gates is $393 \times 5 = 1965$, which is very large number. The busy checks must be carried out in parallel for request for a plurality of ports 2, and accordingly, a number of circuits of FIG. 2 corresponding to the number of the ports 2, must be provided.

An access priority control system for a main storage for a computer according to an embodiment of the present invention will be explained with reference to FIG. 3.

Figure 3B:
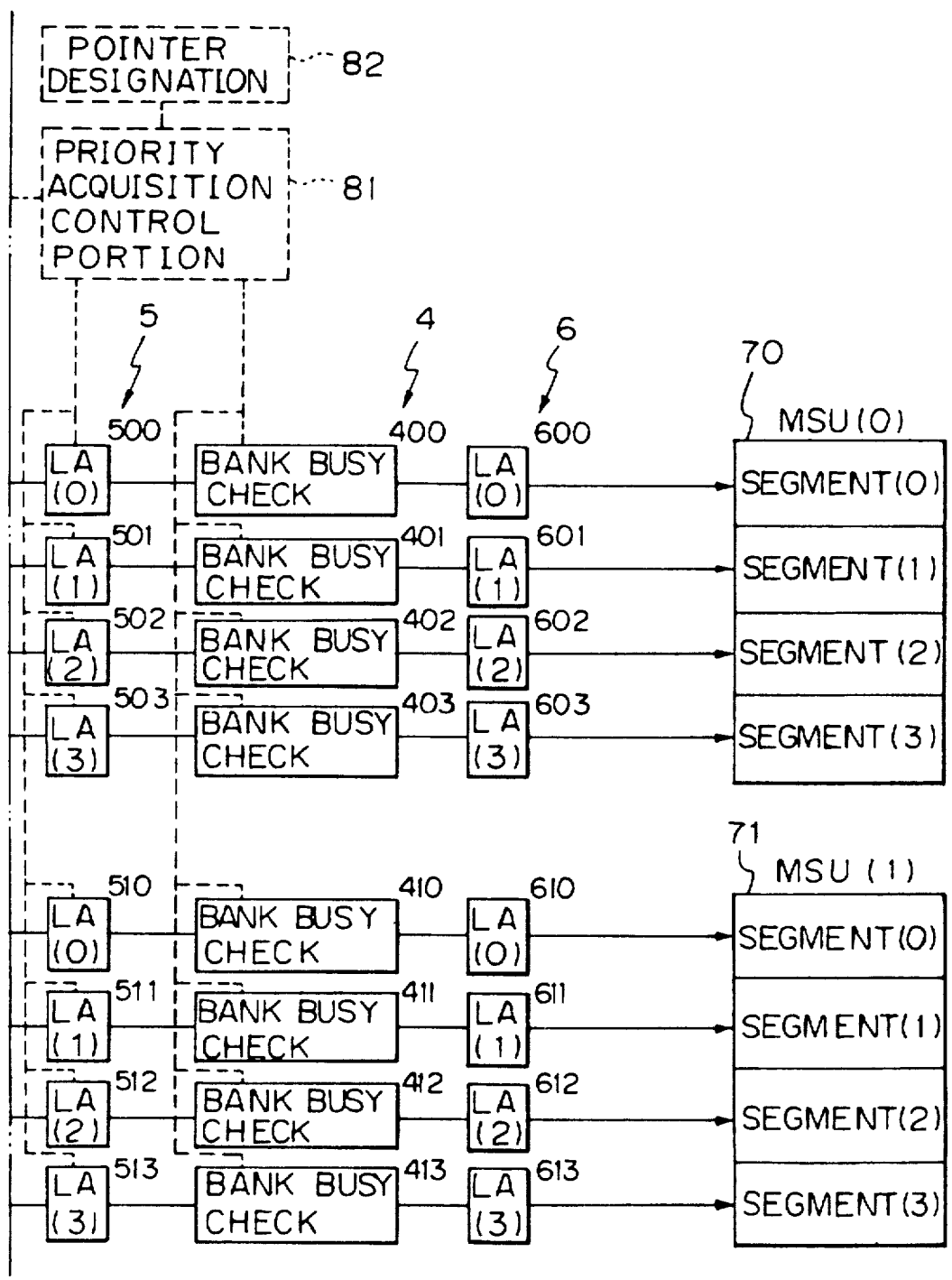
FIG. 3, formed by FIGS. 3A and 3B, shows an access priority control system for a main storage for a computer according to the embodiments of the present invention.

It should be noted that, in FIG. 3 as well as in FIG. 1, only signal lines for a priority control in question are drawn between the blocks and illustration of address buses and data buses is omitted for convenience. Also, only signal lines for start signals for storage segments are drawn from the third latch circuit 6 to the storage segments 70, 71 and the illustration of buses and registers for transmitting addresses and data is omitted for convenience.

The system of FIG. 3 is constituted by a sequence of central processor units (CPU) 10 to 14, a first sequence of latch circuits (LA) 20 to 24 as a first sequence of access ports, a bus conflict check and prohibition condition check circuit 3, a second sequence of latch circuits (LA) 500 to 503 and 510 to 513 as a second sequence of access ports, a sequence of logical storage busy check circuits 400 to 403 and 410 to 413, a third sequence of latch circuits 600 to 603 and 610 to 613, and main storage units (MSU) 70 to 71.

Figure 4:
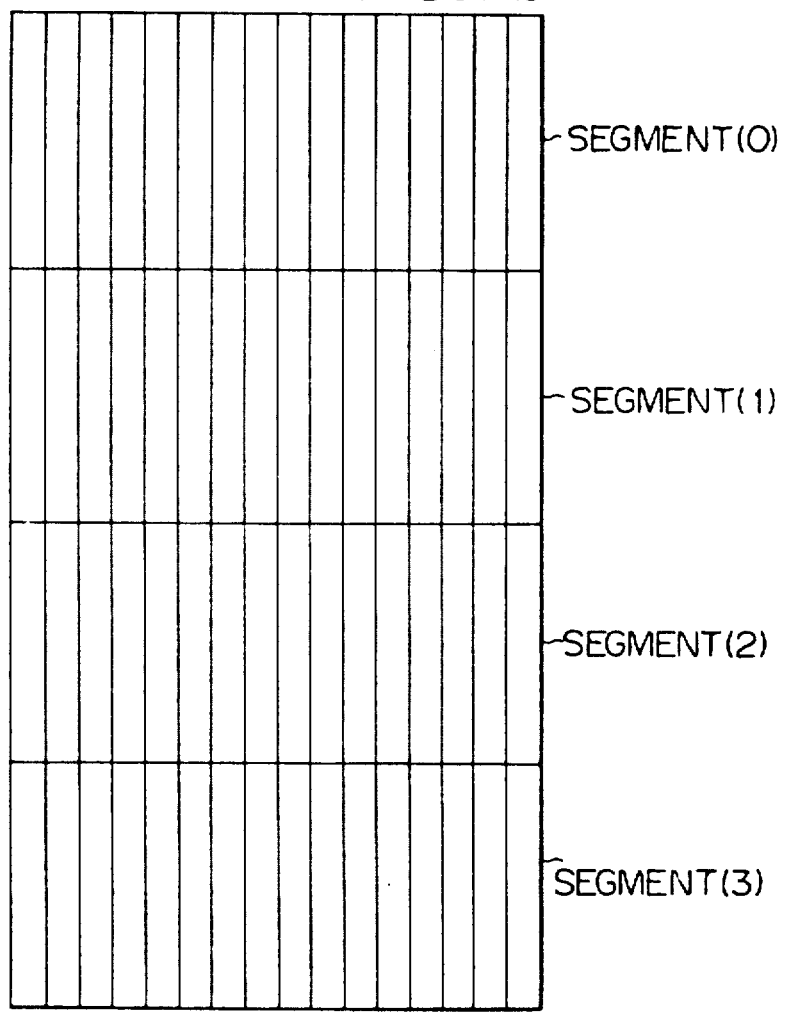
FIG. 4 shows a structure of the main storage unit in the system of FIG. 3.

Each of the main storage units is divided into segments: SEGMENT(0) to SEGMENT(3), and each of the segments is divided into, for example, 16 storage banks, as logical storages as shown in FIG. 4. The third sequence of latch circuits 600 to 603 and 610 to 613 corresponds to the segments of the main storage units 70 and 71. When a valid signal is latched in one of the latch circuits 600 to 603 and 610 to 613, use of a storage bank corresponding to the valid signal is approved.

Each of the main storage units 70 and 71 is constituted by 4 segments, and each segment is constituted by 16 storage banks and therefore, the main storage units 70 and 71 is constituted by 128 storage banks.

The logical storage busy check circuit 4 decodes the lower 4 bit address A3, A2, A1, A0 as an intrasegment address latched in the second latch circuit 5, and checks whether or not the decoded signal coincides with the busy signal. When it is determined to be in the busy state, the read/write operation of the storage bank in question is not approved, but when it is determined to be in the non-busy state, the read/write operation of the storage bank in question is approved.

In the system of FIG. 3, when a conflict occurs between a plurality of requests on one segment, one request is selected in the bus conflict check and prohibition condition check circuit 3, and this selected request is supplied to a logical storage busy check circuit 4. Accordingly, in a segment correspondence portion of the logical storage busy check circuit 4, no conflict occurs between a plurality of requests and a request is always delivered to a storage segment unless a busy state is detected.

In the system of FIG. 3, the checking by the bus conflict check and prohibition condition check circuit 3 is carried out in a first priority cycle, to select a bus, and the storage bank busy checking by the logical storage busy check circuit 4 is carried out in a second priority cycle.

In the system of FIG. 3, in the first priority cycle, the bus conflict check and prohibition condition check circuit 3, using the upper address bits: A6, A5, A4 set in the first latch circuit 2, carries out the bus selection based on the checking of the bus conflict.

This checking is carried out to determine whether or not the lower 4 address bits, as the intra-segment address bits: A3, A2, A1, A0, can be set in the second latch circuit 5, and the setting of the lower 4 address bits: A3, A2, A1, A0, to the second latch circuit 5 is carried out. Then, in the second priority cycle, the logical storage busy check circuit 4 checks the intrasegment conflict condition, and a determination of the transmission of the request to the main storage unit based on the result of the checking is carried out.

The setting of the request address to the first latch circuit 2 in the first priority cycle can be carried out in the request transfer cycle.

In the system of FIG. 3, when a memory access request is received from an external device, the upper 3 bits: A6, A5, A4, designating one of eight buses of the 7 bit address for designating one of the 128 storage banks: A6, A5, A4, A3, A2, A1, A0, are set in the first latch circuit 2. The bus conflict check and prohibition condition check circuit 3 receives this upper 3 bit address: A6, A5, A4, compares the upper 3 bit address: A6, A5, A4 with the code corresponding to the bus under use by the 3 bit comparison member to detect whether or not a coincidence exists, and determines whether or not the requested bus among the 8 buses corresponding to the 8 segments can be used.

When the requested bus can be used, the selection of this requested bus is carried out. When the requested bus in question is being used for other access requests, the request in question must wait until the use by the other access request is terminated and the use of the requested bus is approved.

Nevertheless, since in the case of the processing of vector data, after the use of a bus is approved, usually the probability of a subsequent access request for the same bus is very high, the selection first of the bus will not have an adverse affect on the performance of the system.

Since the bus conflict check and prohibition condition check circuit 3 is constituted basically by comparator members, the length of the longest logic path of this circuit 3 is relatively short, and the amount of hardware needed for this circuit 3 is relatively small.

In the system of FIG. 3, the logical storage busy check circuit 4 decodes the lower 4 bit address: A3, A2, A1, A0 for designating one of 16 storage banks, and compares the decoded signal with the busy signal.

The logical storage busy check circuit 4 can be constituted such that the amount of hardware needed is much less than needed by the prior art logical storage busy check circuit, and the length of the longest logic path is much shorter than that of the prior art logical storage busy check circuit.

Figure 5:
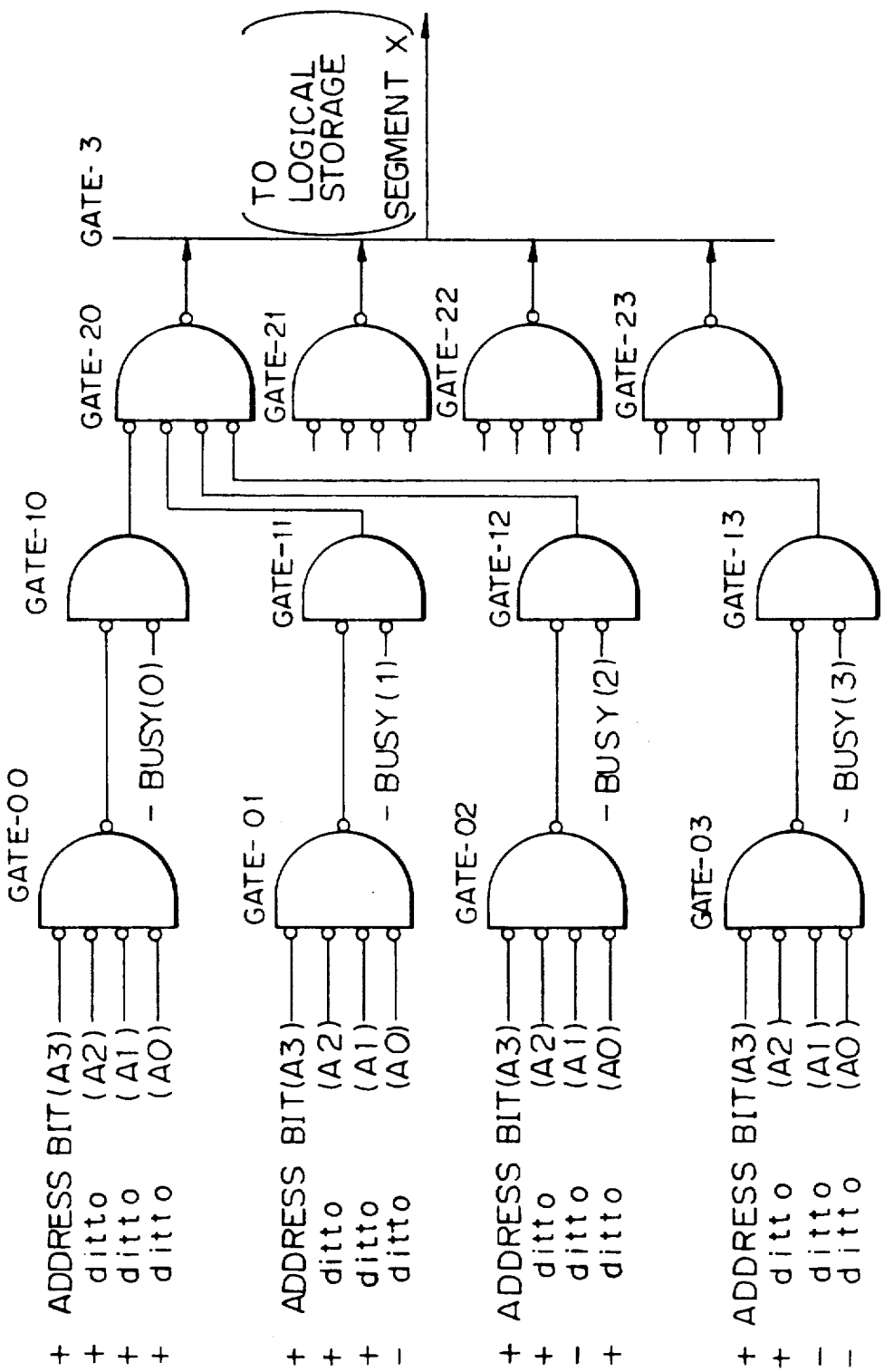
FIG. 5 shows a structure of a part of the logical storage busy check circuit used for the system of FIG. 3.

The structure of the logical storage busy check circuit 4 used for the system of FIG. 3 is shown in FIG. 5. The logical storage busy check circuit of FIG. 5 is constituted by a sequence of GATE-00 to GATE-03, a sequence of GATE-10 to GATE-13, a sequence of GATE-20 to GATE-23, and GATE-3.

In the logical storage busy check circuit of FIG. 5, the supplied 4 bit address: A3, A2, A1, A0 is decoded, and it is determined whether or not the 16 decoded signals coincide with the busy signal for the 16 storage banks in a section.

Each of GATE-00 to GATE-03, GATE-10 to GATE-13, and GATE-20 to GATE-23 is constituted by an emitter coupled logic circuit. GATE-3 is an emitter dot type OR gate.

The input signal: +ADDRESS BIT(A0), +ADDRESS BIT(A1), +ADDRESS BIT(A2), +ADDRESS BIT(A3), for GATE-00, is a signal having all logic "0"s when the address "A0, A1, A2, A3" is logically "0, 0, 0, 0"; the input signal: +ADDRESS BIT-(A0), +ADDRESS BIT(A1), +ADDRESS BIT(A2), −ADDRESS BIT(A3), for GATE-01 is a signal having all logic "0's" when the address "A0, A1, A2, A3" is logically "0, 0, 0, 1"; the input signal: +ADDRESS BIT(A0), +ADDRESS BIT(A1), −ADDRESS BIT-(A2), +ADDRESS BIT(A3), for GATE-02, is a signal having all logic "0's" when the address "A0, A1, A2, A3" is "0, 0, 1, 0"; and the input signal: +ADDRESS BIT(A0), +ADDRESS BIT(A1), −ADDRESS BIT-(A2), −ADDRESS BIT(A3), for GATE-03, is a signal having all logic "0's" when the address "A0, A1, A2, A3" is "0, 0, 1, 1".

Although 4 gates: GATE-00, GATE-01, GATE-02 GATE-03 are shown as a first sequence in FIG. 5, 16 gates in all exist for all of the segments.

GATE-00 delivers an output "0" when the input signal: +ADDRESS BIT(A0), +ADDRESS BIT-(A1), +ADDRESS BIT(A2), +ADDRESS BIT(A3), are all logic "0's", and the delivered output is supplied to GATE-10. GATE-10 delivers an output "1" when one input supplied from GATE-00 is "0" and the other input of −BUSY(0) is "0".

The output signals of GATE-10 to GATE-13 are supplied to GATE-20. The output signal of GATE-20 is a signal which is logic "1" when at least one of the output signals of GATE-10 to GATE-13 is logic "1". In the device of FIG. 5, there are 4 gates: GATE-20, GATE-21, GATE-22, GATE-23, and the output signals of these 4 gates are supplied to an emitter dot type OR gate: GATE-3. A check is made to detect a coincidence between the decoded 16 signals and the busy signal of 16 storage banks in a segment, and it is not necessary for a gate to be connected to the output terminal of GATE-3.

The comparison of the delay time, the number of gates per unit, and the total number of gates between the device of FIG. 5 and the device of FIG. 2 (prior art) is as follows. The delay time is $3\tau$ for the device of FIG. 5, but $4\tau$ for the device of FIG. 2 where $\tau$ is the delay time for a unit gate.

There are 36 gates per unit for the device of FIG. 5, and 393 gates per unit for the device of FIG. 2. The total number is $36 \times 16 = 576$ (16 buses) for the device of FIG. 5, and $393 \times 5 = 1965$ (5 ports) for the device of FIG. 2.

This comparison shows that the delay time in the cycle of priority determination and the amount of hardware are reduced in the device of FIG. 5 according to an embodiment of the present invention.

As another embodiment of the present invention, the system can be constituted by including at least one access request bus between the processor and the main storage corresponding to a unit data length, an access request from the processor to the main storage being transmitted with the unit data length or a multiple of the unit data length, and a block access from the processor to the main storage being divided into a plurality of smaller access units corresponding to the unit data length in the processor. This embodiment will be explained with reference to FIGS. 3, 4, 5, 6, 7, and 8.

Figure 6:
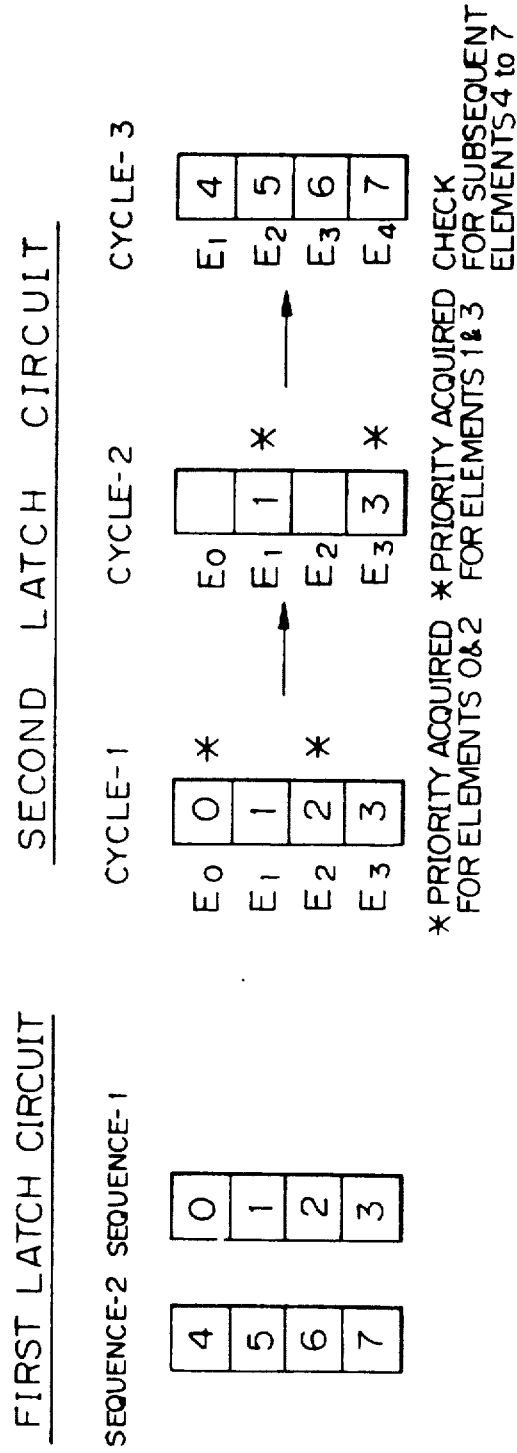
FIG. 6 illustrates the transmission of access requests according to an embodiment of the present invention.

The transmission of access requests is illustrated in FIG. 6.

It is assumed that the data of a block access of an access request from a processor is constituted by a sequence of elements (unit data): 0, 1, 2, 3, 4, 5, 6, 7. In CYCLE-1 of the second latch circuit 5, the logical storage bank busy condition is released (i.e., priority is acquired) for element 0 and element 2, and thus the access request can be transmitted. Since there is no logical storage bank conflict in CYCLE-1, the elements which have acquired priority are transmitted to the main storage.

In CYCLE-2, the logical storage bank busy condition is released for element 1 and element 3, and since the element 1 and element 3 have acquired priority, they are transmitted to the main storage.

Accordingly, in CYCLE-3, the logical storage bank busy condition is checked for the subsequent sequence of elements 4, 5, 6, and 7.

In the block access transmitted with a multiple unit data length, to maintain the regular order of transmitting a plurality of unit data constituting the block, the completion of the block access in question, i.e., the completion of transmitting of the data block, is acknowledged by a priority acquisition control table in a priority acquisition control portion.

Figure 7:
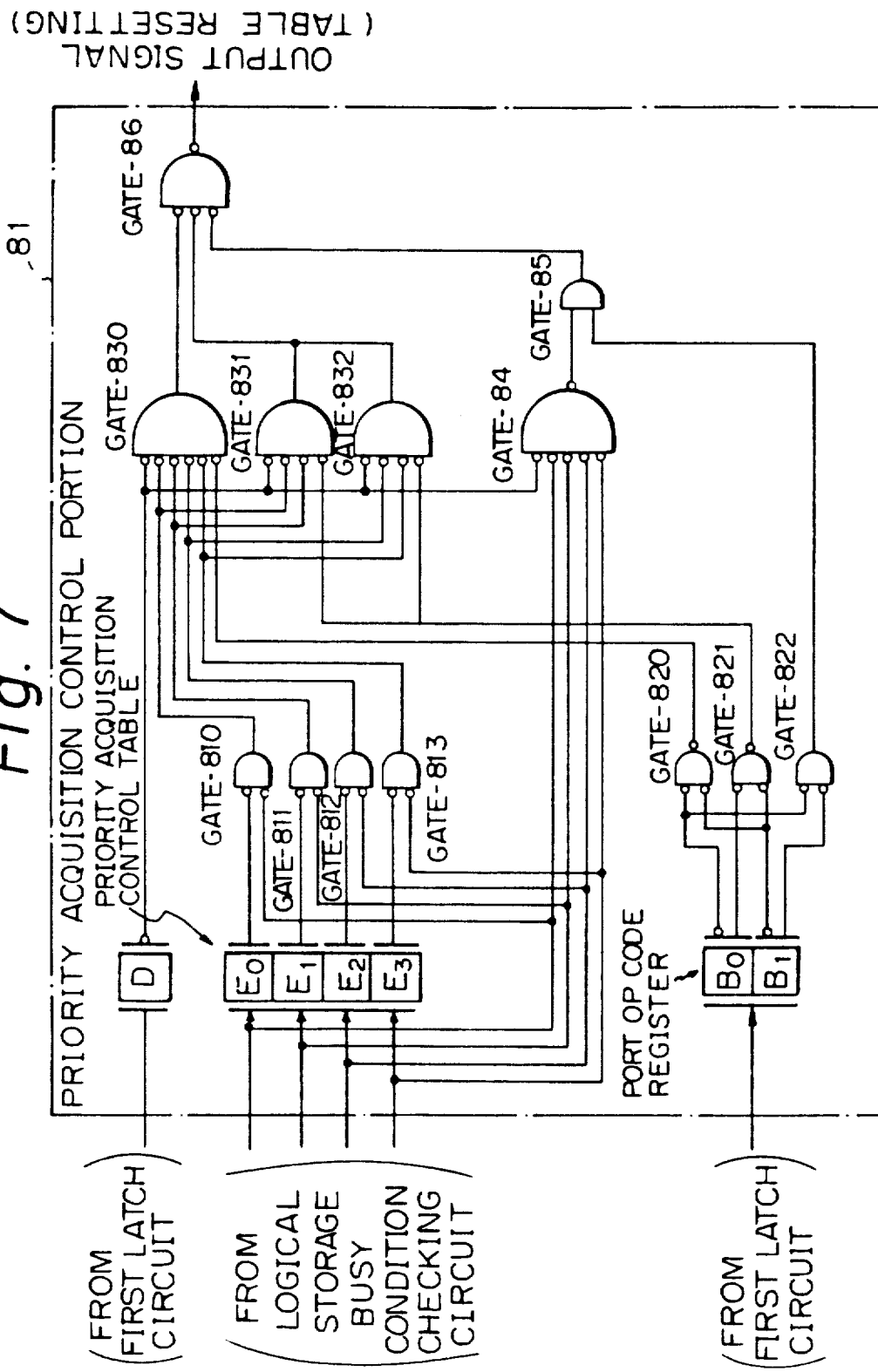
FIG. 7 shows an arrangement of the priority acquisition control table in the priority acquisition control portion.

The arrangement of the priority acquisition control table in the priority acquisition control portion is shown in FIG. 7.

When priorities are acquired for access requests from the second latch circuit 5 in the second priority cycle, logic "1" is transmitted to the priority acquisition table. In the device of FIG. 7, it is assumed that the block access is carried out for, for example, an 8 byte block, a 16 byte block, or a 32 byte block.

Figures 8, 10:
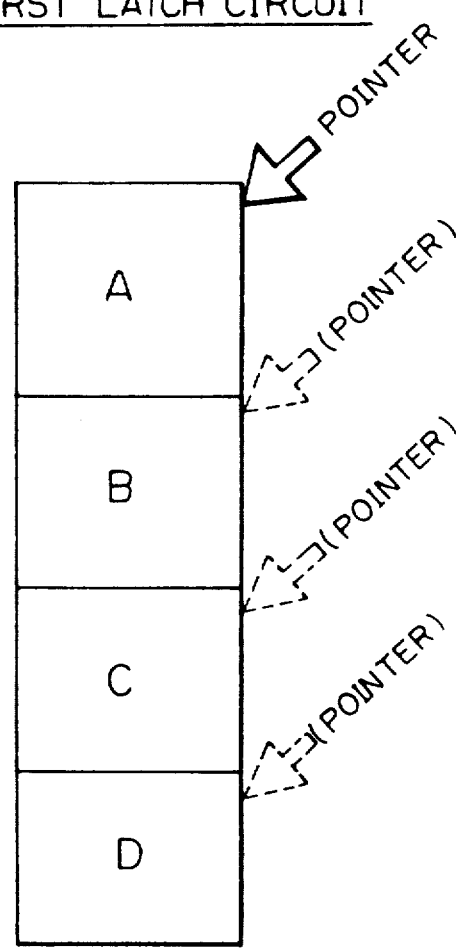
FIG. 8 shows the truth value table of the port OP code register.
FIG. 10 shows a sequence of access ports of the first latch circuits.

In the case of a 32 byte block access in the device of FIG. 7, the port OP code register ($B_0$, $B_1$) is set to logic "1, 1", and according to the truth value table shown in FIG. 8, the output of GATE-820 becomes logic "1" and is supplied to GATE-830.

Then, priority is acquired for the access request signal from the second latch circuit 5, and when the elements $E_0$, $E_1$, $E_2$, and $E_3$ of the control table become all logic "1's", it is acknowledged that a 32 byte block access request has been transmitted, the output of GATE-830 becomes logic "1" through the operations of GATE-810 to GATE-813, and an output signal is delivered from GATE-86 to reset the priority acquisition control table.

In GATE-810 to GATE-813, the logical sum forming operation for the input signal and the output signal of the control table ($E_0$, $E_1$, $E_2$, $E_3$) is carried out. Assuming that the state of $E_0$, $E_1$, and $E_2$ of the control table is logic "1, 1, 1", when a priority of access request signal corresponding to element No. 3 (corresponding to $E_3$) is received in the next cycle, the output of GATE-830 becomes logic "1" through GATE-810 to GATE-813, and the output signal of GATE-86 is delivered to reset the control table ($E_0$, $E_1$, $E_2$, $E_3$) so that the completion of the block access is acknowledged.

The above operations are similar in the case of a 16 byte block access or an 8 byte block access.

The control table ($E_0$, $E_1$, $E_2$, $E_3$) is constituted by flip-flop circuits of the set-priority type. When a priority acquisition signal for the next access request is supplied from the second latch circuit 5 while the above-mentioned control table resetting signal is being delivered, the control table ($E_0$, $E_1$, $E_2$, $E_3$) gives priority to the set operation. Accordingly, the control of the block access is achieved without logic delay.

As still another embodiment of the present invention, the system can be constituted by including at least one access request bus between the processor and the main storage corresponding to a unit data length, and at least one first request port, concerning an access request from the processor to the main storage, for setting an access request corresponding to an access request element which is an element having a unit data length or a length shorter than this unit data length, the order of the access request elements being designated with regard to the execution of a program of operation of the system, a selection of access bus according to address indication position of a request being carried out concerning the output signal of the first request port, and non-occurrence of a reversal of the order designated for execution of the program of the system being ensured in the case where a setting is carried out to a second access port corresponding to the access request bus. This embodiment will be explained with reference to FIGS. 3, 7, 8, 9, 10, 11, and 12.

Figure 9:
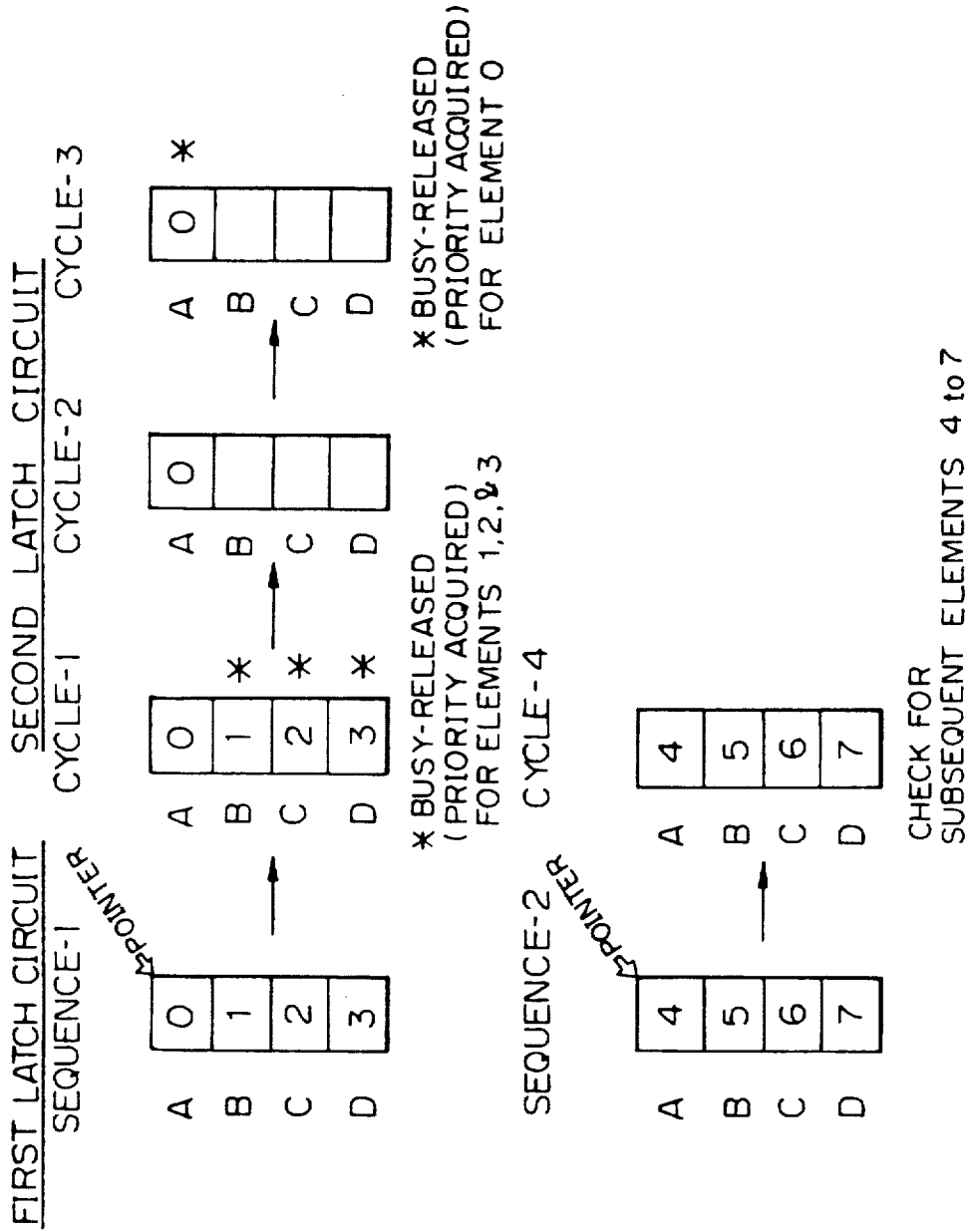
FIG. 9 illustrates the operation of a system according to an embodiment of the present invention.

The operation of the system according to this embodiment is explained with reference to FIG. 9, as follows. It is assumed that a sequence of element data: 0, 1, 2, 3 is set in the first latch circuit 2, in the first priority cycle, as sequence-1. The bus conflict checking for this element data: 0, 1, 2, 3 is carried out, and based on the access port number indicated by the pointer, the element data, which has passed the bus conflict checking, is set to the second latch circuit 5 as CYCLE-1, the sequential order of the execution of program being ensured.

In the second priority cycle, the logical storage busy condition is checked to determine, for example, that an element 0 corresponding to access port A is busy, while elements 1, 2, and 3 are busy-released (i.e., priority is acquired). A busy-released status is marked by an asterisk. Since there is no conflict between the logical storage banks, the access requests of the elements 1, 2, and 3 for which busy conditions are released are transmitted to the main storage, as shown in CYCLE-2.

In CYCLE-2, since the logical storage bank busy condition for element 0 corresponding to access port A is not released, the status of CYCLE-2 is maintained. The subsequent elements 4, 5, 6, and 7 are not allowed be set in the second latch circuit 5, and thus the sequential order of the execution of program is maintained.

In CYCLE-3, the logical storage bank busy condition for element 0 corresponding to access port A is released, and this element 0 is transmitted to the main storage. But, since the pointer is still directed to access port A, a setting of the subsequent elements 4, 5, 6, and 7 is not carried out, and thus the sequential order of the execution of the program is maintained.

In CYCLE-4, the pointer is moved successively to access ports B, C, D and A. The elements 4, 5, 6, and 7 are transmitted to the second latch circuit 5 where the logical storage bank busy conditions are checked, and thus the sequential order of the execution of program is maintained.

An example of the setting condition equation of the control of the request pointer with regard to a sequence of the first access ports: A, B, C, and D shown in FIG. 10 is as follows.

A PORT SET ENABLE = POINTA·AEN ·    equation (1)

POINTB·BEN·CEN·DEN·AEN·$\overline{BCMTCH}$·$\overline{CDMTCH}$·

$\overline{DAMTH}$·$\overline{BDMTCH}$·$\overline{BAMTCH}$·$\overline{CAMTCH}$ -

POINTC·CEN·DEN·AEN·$\overline{DCMTCH}$·$\overline{CAMTCH}$·

$\overline{DAMTCH}$ - POINTD·DEN·AEN·$\overline{DAMTCH}$

This setting condition equation (1) represents a condition of setting to the second latch circuits 5 to ensure the sequential order of execution of a program with regard to the access port A of the first latch circuit 2.

"POINTA.AEN" represents a condition for enabling a setting of the element data of the access port A to the second latch circuit 5. "AEN" denotes that the bus corresponding to the destination address of element data set in access port A is "usable" or the access request occupying the bus in question is now "request-released". The representations of "BEN", "CEN" and "DEN" are similar.

"BCMTCH" represents the bus conflict (bus match) from the first latch circuit 2 to the second latch circuit 5, preventing the transmission of an element of, for example, access port B to the second latch circuit 5. The representations of "CDMTCH", "DAMTCH", "BDMTCH", "BAMTCH" and "CAMTCH" are similar.

Assuming that the pointer is directed to access port B of the first latch circuit 2, where "BEN", "CEN", "DEN", and "AEN", which are destination conditions of element data of access ports B, C, D and A, are all "usable" or "request-released", and no bus conflicts exist concerning the second latch circuit 5, the element data of access port A of the first latch circuit 2 can be set to the second latch circuit 5.

"$\overline{BCMTCH}$" (inverted BCMTCH) and the like represents the non-existence of a bus conflict.

In setting the condition equation (1), the first term at the right side of the equation (1) represents the condition which enables the setting to the second latch circuit 5 when the pointer is directed to access port A, the second term of the right side of equation (1) represents the condition which enables the setting to the second latch circuit 5 when the pointer is directed to access port B, the third term of the right side of equation (1) represents the condition which enables the setting to the second latch circuit 5 when the pointer is directed to access port C, and the fourth term of the right side of equation (1) represents the condition which enables the setting to the second latch circuit 5 when the pointer is directed to access port D.

The setting condition equations which represent the conditions of setting to the second latch circuit 5 to ensure the sequential order of execution of program, with regard to access ports B, C, and D of the first latch circuit 2 can be established in the same way.

An example of the circuit for performing the setting condition equation is shown in FIG. 11.

An example of the changes of designation by the pointer is shown in FIG. 12. In STEP-1, the pointer is directed to the access port A of the first latch circuit. Elements 0 and 1 satisfy the setting condition equation, and thus elements 0 and 1 are set to the second latch circuit, and accordingly, the pointer is moved to access port C.

In STEP-2, elements 4 and 5 are set to access ports A and B. Elements 2, 3, and 4 satisfy the setting condition equation, and elements 2, 3, and 4 are set to the second latch circuit, and accordingly, the pointer is moved to access port B.

In STEP-3, element 6, 7, and 8 are set to access ports C, D, and A. Elements 5 satisfies the setting condition equation, and is set to the second latch circuit, and accordingly, the pointer is moved to access port C to proceed to STEP-4.

What is claimed is:

1. An access priority control system for a main storage for a computer, for controlling a signal transmission to the main storage upon receiving a plurality of storage access requests from at least one processor related to the main storage, said system comprising:

first access request port means for holding at least temporarily a segment address of the storage access requests from the processor;

first control means responsive to the output of said first access request port means for checking bus conflict conditions determined by the address of the storage access request;

second access request port means responsive to the output of said first control means for holding at least temporarily an intra-segment of said storage access request; and second control means responsive to the output of said second access request port means for checking logical storage busy conditions in the storage segments in different clock cycles than the checking of the bus conflict conditions by said first control means.

2. An access priority control system according to claim 1, wherein the for a main storage for a computer, for controlling a signal transmission to the main storage upon receiving a plurality of storage access requests from at least one processor related to the main storage, said system comprising:

first access request port means for holding at least temporarily a segment address of the storage access requests from the processor;

first control means responsive to the output of said first access request port means for checking bus conflict and prohibition conditions for a destination storage segment determined by the address of the storage access request;

second access request port means responsive to the output of said first control means for holding at least temporarily an intra-segment address of said storage access request; and second control means responsive to the output of said second access request port means for checking logical storage busy conditions in the storage segments in different clock cycles than the checking of the bus conflict and prohibition conditions by said first control means.

3. A system according to claim 2, wherein said first control means comprises a comparator circuit, operatively connected to said first and second access request port means, for comparing the segment address of the storage access request with the segment address indicating a bus-in-use state.

4. A system according to claim 2, wherein said second control means comprises a busy check circuit, operatively connected to said second access request port means, for decoding the intra-segment address of the storage access request and checking coincidence between the decoded signal and a busy signal for the storage banks.

5. A system according to claim 2, wherein a cycle in which the checking by said first control means is carried out corresponds to a request transfer cycle.

6. A system according to claim 2, further comprising means for transmitting an access request to the main storage for each unit data length so that the transmitting orders of block accesses are optionally controlled.

7. A system according to claim 2,
   wherein the at least one processor and the main storage are operatively connected by at least one access bus;
   wherein said first control means comprises first priority cycle means for the processor for checking bus conflicts between access ports corresponding to segments of the main storage; and
   wherein said second control means comprises second priority cycle means for the processor for checking of busy conditions of logical storage banks for each access bus and for controlling transmission of an access request to a logical storage bank for each unit data when the busy condition checking indicates a non-busy state.

8. A system according to claim 7, wherein said system further comprises priority acquisition control table means for controlling a priority acquisition for unit data from each access port in the second priority cycle, for detecting transmission completion of all unit data of a block from a plurality of unit data from access ports according to priority information for each unit data in said priority acquisition control table means and for determining completion of a block access upon detection of transmission completion for all unit data.

9. An access priority control system according to claim 2,
   further comprising at least one access request bus, between the processor and the main storage, corresponding to a unit data length,
   wherein said first access request port means comprises at least one first request port, between said access request bus and the processor, for an access request from the processor to the main storage, corresponding to an access request element having a length no longer than a unit data length, an order of access request elements being designated with regard to execution of a program for operation of said system, said first request port selecting one of said at least one access request bus according to an address indication position of a request being carried out by producing an output signal and
   wherein said second access request port means comprises at least one second access port between said access request bus and the main storage, the program for operating the processor avoiding reversal of the order designated for execution thereof where a setting is carried out to one of said at least one second access port corresponding to said at least one access request bus.

10. A system according to claim 2, wherein said second control means checks conflicts in an access request bus in question only for the output signal of the second request port corresponding thereto, to determine whether transmitting of an access request in question is approved.

11. A system according to claim 2, wherein said system further comprises:
    first priority cycle means for setting access requests in the second access request port means in a regular sequence in accordance with the checking of bus conflict conditions between said first access request port means corresponding to main storage segments and a pointer for designating an order in a program execution sequence, an access request being selected and set in said second access request port means by said first priority cycle means by giving the highest priority to a port designated by the pointer; and
    second priority cycle means for checking logical storage bank busy conditions for each access port and when the logical storage bank busy checking indicates a non-busy state, for permitting transmission of access requests for each unit data.

* * * * *